United States Patent [19]

Swars et al.

[11] Patent Number: 5,037,490
[45] Date of Patent: Aug. 6, 1991

[54] PROCESS FOR ALLOWING PRETREATMENT OF ASSEMBLED CAMSHAFT COMPONENTS

[75] Inventors: Helmut Swars, Bergisch Gladbach; Heribert Grewe, Overath, both of Fed. Rep. of Germany

[73] Assignee: Emitec Gesellschaft fur Emissionstechnologie mbH, Lohmar, Fed. Rep. of Germany

[21] Appl. No.: 452,558

[22] Filed: Dec. 18, 1989

[30] Foreign Application Priority Data

Dec. 17, 1988 [DE] Fed. Rep. of Germany ....... 3842593

[51] Int. Cl.$^5$ .................... C21D 9/30; C21D 1/26
[52] U.S. Cl. ........................... 148/12 R; 148/12.3; 148/12.4; 148/134; 148/142; 148/145; 148/146; 148/148; 148/150; 148/152; 148/154
[58] Field of Search ............... 148/134, 142, 154, 150, 148/152, 145, 12 R, 12.3, 12.4, 146, 148; 74/567

[56] References Cited

U.S. PATENT DOCUMENTS 3,110,636  11/1963  Newhouse ............... 148/148
3,140,964  7/1964  Middlemiss .............. 148/148

Primary Examiner—R. Dean
Assistant Examiner—Margery S. Phipps
Attorney, Agent, or Firm—Toren, McGeady & Associates

[57] ABSTRACT

A process for allowing pretreatment of components for an assembled camshaft in the course of whose production drive elements are attached in a force-locking way to a tube through plastic expension of individual tube portions while exceeding the limit of elasticity of the material, in the case of which, while using a tube material with a low yield point suitable for plastic expansion relative to the drive elements, the material at one tube end for the purpose of inserting a sleeve which is connected to a driving pinion and which is to be expanded, is quenched and tempered to achieve an increased tensile strength, or the tubular portions intended to be used as bearing regions are surface hardened in order to achieve bearing properties.

16 Claims, 1 Drawing Sheet

PROCESS FOR ALLOWING PRETREATMENT OF ASSEMBLED CAMSHAFT COMPONENTS

BACKGROUND OF THE INVENTION

The invention relates to a process for allowing pretreatment of components for an assembled camshaft in the course of whose production drive elements are attached in a force-locking way to a tube by plastic expansion of individual tube portions while exceeding the limit of elasticity of the material.

When producing assembled shafts, especially camshafts of the above mentioned type, it has been regarded as a special advantage that the drive element used, i.e. cams and drive elements, as well as bearing sleeves and possibly crank webs may be finish-machined prior to being connected hydraulically and that after producing the connection, the finished component is available. The tube material has to be selected as a function of the necessary different material properties of the various drive elements, with the relationship of yield points having to be taken into account to ensure that the limit of elasticity in the tube material is exceeded during expansion, whereas deformation in the material of the drive elements remains purely elastic, as otherwise the necessary force-locking connection cannot be produced. This limits the selection of materials, especially if cast cams are used which may crack if excessive elastic deformation through the expanded tube occurs. Furthermore, the tube material determined by the above conditions requires the application of separate bearing rings because the running properties of the untreated tube material are not always sufficient. Finally, it should be noted that the highly loaded connections for fixing driving pinions do not always meet the respective requirements.

SUMMARY OF THE INVENTION

Accordingly, it is an object of the present invention to provide a process for pretreating the components so as to produce shafts with overall improved properties, especially in the region of the different connections and in the bearing regions, and a process for overcoming the above-mentioned limitations.

Pursuant to this object, and others which will become apparent hereafter, one aspect of the present invention resides in soft annealing, at least the tube end to be expanded locally prior to applying the drive elements and carrying out the expansion process, especially by induction heating if a tube material is used which has bearing properties but whose yield point is disadvantageously high for plastic expansion relative to the drive elements. Even if tubes are used which have direct bearing properties and in the case of which it is not necessary to apply separate bearing sleeves, this process permits the production of secure connections between drive elements, especially between the driving pinion and the tube if there exist limitations regarding the material of the drive elements.

The soft annealing process in accordance with the invention refers in particular to the tube end region where fixing a driving pinion is always particularly problematical in view of the high torques to be introduced there. With predetermined limitations regarding the outer diameter of the shaft in this region, the soft-annealed end is preferably reduced in its diameter prior to being fixed relative to the drive element. To be able to use short lengths of driving pinion sleeves used for fixing purposes, the sleeve region, furthermore, is preferably quenched and tempered to be able to achieve the elastic prestress required for producing a force-locking connection with a small diameter.

The same applies to cams which are connected to an attached sleeve relative to which the tube material is to be expanded. In this case, too, the sleeve connected to the cam, depending on the material selected, may be quenched and tempered to increase the strength values.

A further embodiment includes using a tube material with a low yield point, such as C35 steel which includes 0.40%–0.70% Mn, 0.15–0.35% silicon, less than 0.045% sulfur, less than 0.045% phosphorus, and 0.35% carbon, suitable for plastic expansion relative to the drive elements and quenching and tempering the material at one tube end to achieve an increased tensile strength, for the purpose of inserting a sleeve which is connected to a driving pinion and which is to be expanded.

The inserted sleeve then has to be expanded relative to the tube end whose strength has been increased. Depending on the material selected for the driving pinion and the sleeve connected thereto, the latter may first be soft-annealed in the region where it is inserted into the tube end.

An additional embodiment of the invention includes thermally or mechanically surface-hardening the tubular portions intended to be used as bearing regions, for example by induction surface hardening, rolling or shot peening, in order to achieve bearing properties when using a tube material with a low yield point suitable for plastic expansion relative to the drive elements. In this way it is possible to produce a shaft which has finished bearing regions without requiring separate bearing sleeves, with the conditions in the regions to be expanded being adapted to the requirements for producing a reliable connection. Again, it has to be regarded as a special advantage that the necessary process stages can be carried out on a smooth tubular member permitting the necessary devices to have a simple design. In all cases, contrary to the treatment measures to be carried out on the finish-assembled shaft, the process stages in accordance with the invention are easy to execute due to the symmetric shape of the workpiece to be treated.

Instead of the thermal surface hardening operation, it is also possible to apply mechanical surface hardening by compressing or pretensioning the surface, which operation can also be carried out with simple means, especially if one takes into account that, as a rule, all bearing regions have the same width.

This process, too, may be complemented in that a tube end region into which a driving pinion sleeve will be inserted for connecting purposes is quenched and tempered in order to increase the yield point for building up the necessary elastic prestress.

However, if a drive element in the form of a driving pinion or cam with an adjoining sleeve is slid onto the tube or tube end for attaching purposes, this process provides a special advantage in that no further preparatory measures have to be carried out on the tube. Again, the sleeves of the drive elements may be quenched and tempered in an advantageous way.

The novel features which are considered as characteristic for the invention are set forth in particular in the appended claims. The invention itself, however, both as to its construction and its method of operation, together with additional objects and advantages thereof, will be best understood from the following description of spe-

DETAILED DESCRIPTION OF PREFERRED EMBODIMENTS

Figure 1:
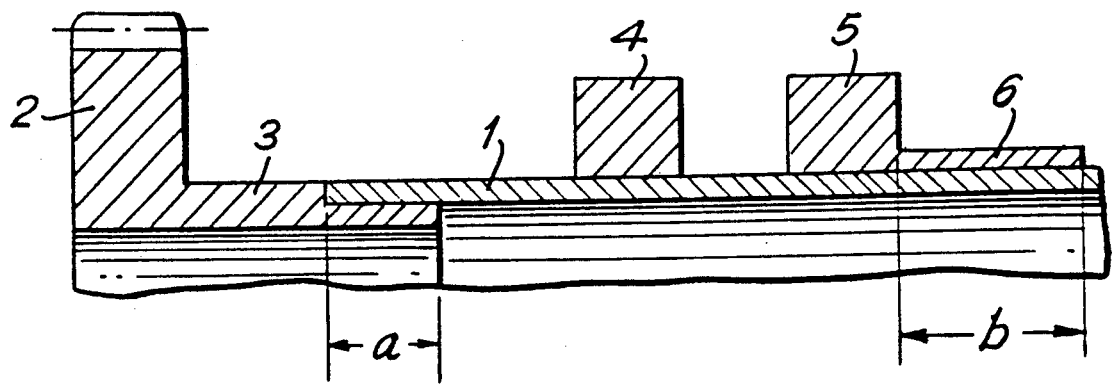
FIG. 1 shows a tube with a quenched and tempered end region.

FIG. 1 shows a tubular member 1 at one end of which there has been inserted a driving pinion 2 with an adjoining sleeve 3 designed in one piece. A first drive element 4 and a second drive element 5 have been slid onto the tube, with the latter comprising a sleeve 6 which is designed in one piece and which may serve as a bearing region. The region "a" of the sleeve 3 may be soft-annealed, whereas the corresponding region of the tubular member 1 is quenched and tempered.

Figure 2:
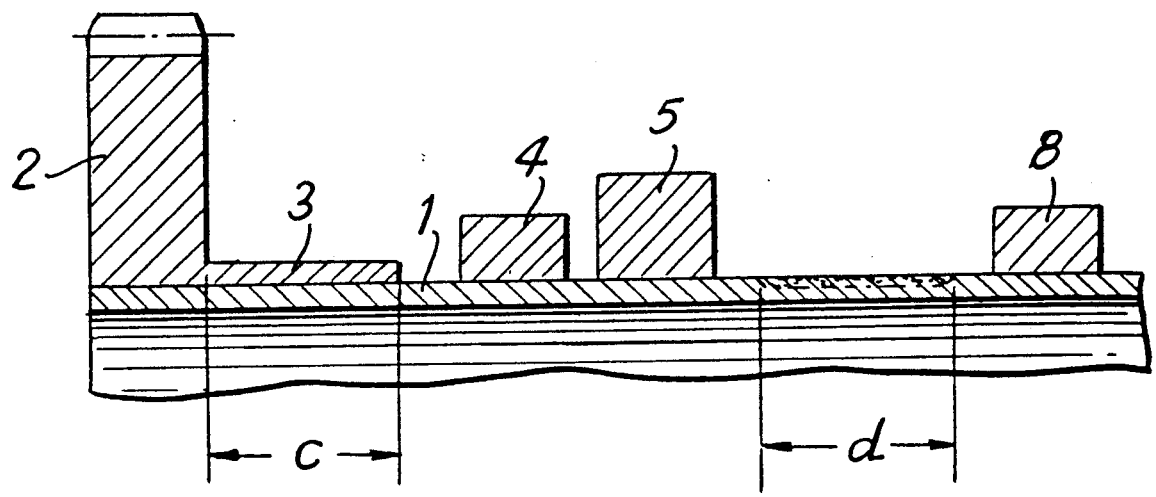
FIG. 2 illustrates a tube with a hardened bearing region.

FIG. 2 shows a tubular member 1. A driving pinion 2 which is connected to a sleeve 3 designed in one piece has been slid onto the end of the tubular member 1. Furthermore, drive elements 4, 5 and 8 are identifiable. The sleeve 3 whose material may be quenched and tempered may form a bearing region "c" and a further bearing region "d" is surface hardened between the drive elements 5 and 8 at the tube, whereas the remaining tube regions remain untreated.

Figure 3:
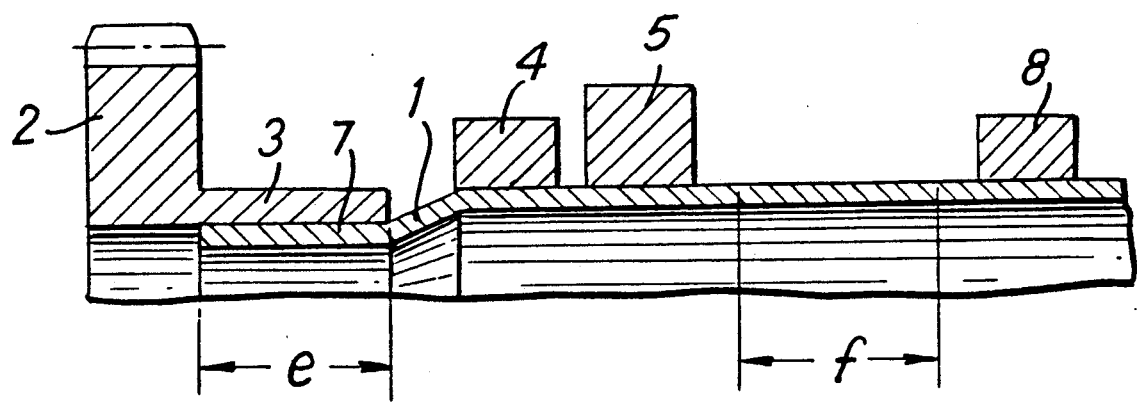
FIG. 3 shows a tube with a soft-annealed end region.

FIG. 3 again shows a tubular member 1 whose end in this case is provided with a driving pinion 2 comprising a sleeve 3 which is designed in one piece and slid onto the reduced tube end 7. Furthermore, drive elements 4 and 5 and a drive element 8 are attached to the tube 1. The reduced tube region "e" for fixing the sleeve and possibly further regions for fixing the drive elements are soft-annealed. The region "f" of the tube may be used as a bearing region without any further pretreatment.

While the invention has been illustrated and described as embodied in a process for allowing pretreatment of components for an assembled camshaft, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. A process for allowing pretreatment of components for an assembled camshaft in the course of whose production drive elements are attached in a force-locking way to a tube by plastic expansion of individual portions of the tube while exceeding the limit of elasticity of the tube material, the process comprising the steps of: using a tube material having a low yield point suitable for plastic expansion relative to the drive elements; and quenching and tempering the tube material at one tube end so as to achieve an increased tensile strength, for the purpose of inserting a sleeve which is connected to a driving pinion and which is to be expanded.

2. A process according to claim 1, wherein the quenching and tempering step includes quenching and tempering the material at one tube end to achieve a tensile strength in excess of 600 N/mm$^2$.

3. A process according to claim 1, including soft-annealing a steel driving pinion having an axially attached sleeve for insertion into and attached inside the tube end in the region of insertion.

4. A process according to claim 3, wherein the soft-annealing of the insertion region of the steel driving pinion includes induction heating of the region.

5. A process for allowing pretreatment of components for an assembled camshaft in the course of whose production drive elements are attached in a force-locking way to a tube by plastic expansion of individual portions of the tube while exceeding the limit of elasticity of the tube material, the process comprising the steps of: using a tube material with a low yield point suitable for plastic expansion relative to the drive elements; and, surface-hardening tubular portions intended to be use as bearing regions in order to achieve bearing properties.

6. A process according to claim 5, wherein the surface-hardening step includes thermally surface hardening the bearing regions.

7. A process according to claim 6, wherein the step of thermal surface hardening is carried out by induction methods.

8. A process according to claim 5, wherein the surface hardening step includes mechanically surface hardening the bearing regions.

9. A process according to claim 8, wherein the step of mechanically surface hardening includes one of rolling or shot peening the bearing regions.

10. A process according to claim 1, wherein the step of using a tube material of a low yield point includes using C35 or a similar material as the tube material.

11. A process according to claim 5, wherein the step of using a tube material of a low yield point includes using C35 or a similar material as the tube material.

12. A process according to claim 1, including using C35 or a similar material for the drive elements.

13. A process according to claim 5, including using C35 or a similar material for the drive elements.

14. A process for allowing pretreatment of components of an assembled camshaft in the course of whose production drive elements are attached in a force-locking way to a tube by plastic expansion of individual portions of the tube while exceeding the limit of elasticity of the tube material, the process comprising the steps of: using a tube material with bearing properties and a high yield point which is disadvantageous for plastic expansion relative to the drive elements; and soft-annealing at least the material of a tube end to be expanded prior to attaching the drive elements and expansion thereof.

15. A process according to claim 5, including using steel drive elements having an axially attached sleeve for sliding on to and attaching to the tube, and quenching and tempering the attached sleeve.

16. A process according to claim 14, including using steel drive elements having an axially attached sleeve for sliding on to and attaching to the tube, and quenching and tempering the attached sleeve.

* * * * *